United States Patent Office 3,172,900
Patented Mar. 9, 1965

3,172,900
THIOCARBONIC ACID ESTERS OF
DIFUNCTIONAL PHENOLS
Gilbert H. Berezin and Bryant C. Fischback, Walnut
Creek, and Guy H. Harris, Concord, Calif., assignors
to The Dow Chemical Company, Midland, Mich., a
corporation of Delaware
No Drawing. Filed Dec. 12, 1960, Ser. No. 75,101
11 Claims. (Cl. 260—455)

The present invention relates to a new class of aromatic organic compounds and more specifically concerns the thiocarbonic acid esters of difunctional phenols which can be represented by the following generic formulae

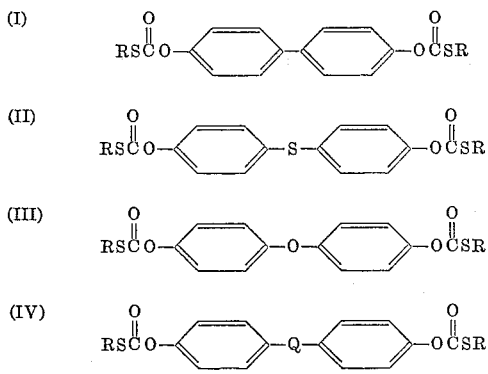

wherein Q is an alkylene or cycloalkylene group containing from 1 to 6 carbon atoms, inclusive; and R represents either an alkyl group containing from 1 to 18 carbon atoms, inclusive, an aryl group, an arylalkyl group, an alkylaryl group, or a haloaryl group. The new compounds of the present invention are useful as antioxidants.

It has now been found that the novel compounds of the present invention may be prepared by first reacting a thiochloroformic acid ester having the following formula

wherein R has the aforesaid significance, with a tertiary organic base such as pyridine to form an active complex and then reacting the complex with a bifunctional phenol. An alternative method of preparation of the new compounds is to react the phenol with an inorganic base and subsequently to react the salt with the thiochloroformic acid ester. The resulting product in either case can be isolated by neutralization of the base with an acid and recrystallization from an organic solvent. Good results are obtained when the base is employed in excess over the stoichiometric quantity based on the amount of acid chloride employed. It is preferable and desirable to employ at least 2 moles of the thiochloroformic acid ester to one mole of the difunctional phenol although any proportion of reactants will give some of the desired product. The order of the addition of the reactants is not critical although the best results are obtained when, in the case where the tertiary organic base is employed, the acid chloride and tertiary organic base are first reacted and to the complex formed thereby is added the phenol dissolved in an additional quantity of the organic tertiary base. In the case where the inorganic base is employed the acid chloride is added to the base-phenol mixture suspended in an inert liquid medium, as for example, diethyl ether. The temperature of the reaction can conveniently be from $-20°$ C. to $100°$ C. and preferably between about $0°$ and about $50°$ C. and at atmospheric pressure although subatmospheric or superatmospheric pressures may be employed.

The various phenols which can be employed in accordance with the teachings of the present invention to prepare the new and useful class of thiocarbonic acid esters are the biphenols, the alkylene and alkylidene bisphenols, the oxybisphenols and the thiobisphenols. Thus, one can employ biphenol, 4,4'-oxybisphenol, 4,4'-thiobisphenol, 4,4' - methylenebisphenol, 4,4' - ethylenebisphenol, 1,3-trimethylene-4,4'-bisphenol, 1,4-tetramethylene-4,4'-bisphenol, 4,4'-isopropylidenebisphenol, 1-butylidene-4,4'-bisphenol, 2-butylidene-4,4'-bisphenol, 1-, 2-, and 3-pentylidene-4,4'-bisphenols, 1,6-hexamethylene-4, 4'-bisphenol, 1-, 2-, and 3-hexylidene-4,4'-bisphenols, 4, 4' - cyclopentylidenebisphenol, 4,4' - cyclohexylidenebisphenol, and the like.

The various thiochloroformates which can be employed in accordance with the present invention are those having the general formula

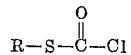

wherein R represents an alkyl radical having from 1 to 18 carbon atoms, an aryl radical, an arylalkyl radical, an alkylaryl radical, or a haloalkyl radical. Thus one can employ S - methylthiochloroformate, S - ethylthiochloroformate, S-n-propylthiochloroformate, S-isopropylthiochloroformate, S-n-butylthiochloroformate, S - isobutylthiochloroformate, S-t-butylthiochloroformate, S-amylthiochloroformate and its isomers, S-hexylthiochloroformate and its isomers, S-n-octyl and S-isooctyl-thiochloroformates, isomeric forms of sulfur-substituted decyl, undecyl, dodecyl, hexadecyl, and octadecyl thiochloroformates, and the like, as well as S-phenylthiochloroformate, S-(alkylphenyl)thiochloroformates having 7 to 18 carbon atoms in the alkylaryl or arylalkyl moiety, such as S-p-tolylthiochloroformate, S-o-tolylthiochloroformate, S-p-dodecylphenylthiochloroformate, S-benzylthiochloroformate, S-phenethylthiochloroformate, S-naphthylthiochloroformate, and the like, as well as their halogen derivatives such as bromo-, chloro-, iodo-, and fluoro-.

The inert organic solvents which can be employed to suspend inorganic base-phenol mixture, when the inorganic base method is used, are the water-immiscible non-reactive organic solvents. Representative of such water-immiscible non-reactive organic solvents which can be employed are diethyl ether, toluene, perchloroethylene, n-heptane, and the like.

The tertiary organic bases which can be used to remove the hydrogen chloride of reaction are those commonly employed in organic reactions which are stable under the conditions of reaction such as pyridine, the various lutidine isomers, quinoline, the trialkylamines, and the like.

The inorganic bases which can be used in accordance with the present invention are the alkali metal hydroxides or carbonates, and their chemical equivalents.

The following examples are illustrative of the present invention but are not to be construed as limiting.

EXAMPLE 1

Into a 250 ml. round bottom flask was charged 50 ml. of pyridine. S-methylthiochloroformate (13.5 grams; 0.12 moles) was added slowly with cooling (ice bath) and stirring whereupon a white solid precipitated. 4,4'-isopropylidenebisphenol (12.4 grams; 0.0476 mole) dissolved in 20 ml. of pyridine was added rapidly with stirring (ice bath cooling maintained). The mixture turned yellow and the color soon faded and a white suspended solid remained. The ice bath was removed and agitation was continued for two hours. The mixture was added to cold dilute hydrochloric acid (sufficient to completely neutralize all the pyridine present). A white solid separated. This was collected by filtration, washed with water, and after drying was recrystallized from ethanol to yield 17.0 grams of 4,4'-isopropylidenebisphenol di(S-methylthiocarbonate), which represents 95 percent of the theoretical amount. The melting point of the product was 92–3° C.

EXAMPLE 2

In a similar manner, S-p-chlorophenylthiochloroformate (22.0 grams; 0.12 mole) was added to pyridine and then treated with a pyridine solution of 4,4'-methylenebisphenol (10.5 grams; 0.0522 mole). The reaction was similar to that of Example 1. The crude product obtained after neutralization was recrystallized from ethanol to yield 23.0 grams (81.5 percent of the theoretical amount based on the 4,4'-methylenebisphenol employed). The 4,4'-methylenebisphenol di(S-p-chlorophenylthiocarbonate) melted at 133–5° C.

EXAMPLE 3

In a similar manner, p,p'-biphenol was reacted with S-methylthiochloroformate in pyridine to yield a product which upon recrystallization from ethanol melted at 143–4° C. Sulfur analysis of the product gave 18.8 percent compared to a theoretical value of 19.1 percent calculated for 4,4'-biphenol di(S-methylthiocarbonate).

EXAMPLE 4

Using the procedure of Example 1, 4,4'-thiobisphenol may be reacted with S-methylthiochloroformate to prepare the corresponding ester.

EXAMPLE 5

To 60 ml. of boiling toluene was added 4,4'-isopropylidenebisphenol (4.57 grams; 0.02 mole). When solution was complete, sodium hydroxide (1.68 grams; 0.041 mole) was added as a 50 percent solution in water, causing formation of a slurry of the bisphenol di-sodium salt in the toluene. The slurry was cooled to room temperature and then treated with S-p-chlorophenylthiochloroformate (10.35 grams; 0.05 mole) with stirring. After one hour, addition of 10 ml. of water causes separation of two clear phases. The toluene phase contains the desired 4,4'-isopropylidenebisphenol di(S-p-chlorophenylthiocarbonate).

EXAMPLE 6

Into a 500 ml. round bottom flask was charged 75 ml. of pyridine. S-phenylthiochloroformate (20.7 grams; 0.12 mole) was added slowly with cooling (ice bath) and stirring. 4,4'-isopropylidenebisphenol (11.4 grams; 0.05 mole) dissolved in 75 ml. pyridine was added rapidly with continued cooling and stirring. The ice bath was removed and agitation continued for two hours. The mixture was then poured into an excess of HCl-ice mixture. Methylene dichloride (150 ml.) was used to extract the crude product from the aqueous acid. After removal of methylene chloride, the crude product was dissolved in one liter of hot ethanol and decolorized with activated charcoal. Crystallization yielded 20.1 grams (84.5 percent of theoretical yield) of 4,4'-isopropylidenebisphenol di(S-phenylthiocarbonate), which melted at 105–106° C.

EXAMPLE 7

In a similar manner, 4,4'-isopropylidenebisphenol di-(S-p-tolylthiocarbonate) was prepared from 4,4'-isopropylidenebisphenol and S-p-tolylthiochloroformate in pyridine. Recrystallized from iso-octane-toluene mixture, its melting point was 136.5–139° C.

EXAMPLE 8

In a similar manner, 4,4'-methylenebisphenol di(S-dodecylthiocarbonate) was prepared by reacting S-dodecylthiochloroformate with 4,4'-methylenebisphenol in pyridine. The crude product was recrystallized from methanol. The purified product melted at 45–47° C.

EXAMPLE 9

In a similar manner, S-isopropylthiochloroformate was reacted with 4,4'-methylenebisphenol in pyridine. After recrystallization from pentane at ice temperature, the 4,4'-methylenebisphenol di(S-isopropylthiocarbonate) recovered melted at 48–52° C.

The compounds of the present invention are particularly useful as antioxidants and antiozonants for use with polymerizable and polymerized hydrocarbons such as polyethylene, polypropylene, etc. and in foodstuffs such as edible fats and oils. Further they are useful as intermediates in the production of polycarbonate resins, polycarbamate resins, polythiocarbamate resins, and the like. To demonstrate the utility of the compounds as antioxidants the following experiment was performed: 1 part by weight of antioxidant compound herein claimed was dissolved in 99 parts of polypropylene above the melting point of the latter. The hot mixture was cast into a film of approximately 2.5 mil thickness. This was, in turn, subjected to a stream of oxygen at 150° C. The number of hours where little or no oxygen was absorbed is a measure of the effectiveness of the antioxidant being tested. On a plot of time versus oxygen uptake, a break in favor of greater oxygen absorption per unit time is considered the point at which antioxidant effectiveness ceases.

The following tables list antioxidant effectiveness of compounds claimed in this patent and closely-related compounds:

Table I
CLAIMED COMPOUNDS

| Compound | Structure | Oxygen Induction Time (Hours) |
|---|---|---|
| 4,4'-biphenol di(S-methylthiocarbonate) | $CH_3SCO$—O—⟨C_6H_4⟩—⟨C_6H_4⟩—O—$COSCH_3$ | 55.0 |
| 4,4'-methylenebisphenol di(S-methylthiocarbonate) | $CH_3SCO$—O—⟨C_6H_4⟩—$CH_2$—⟨C_6H_4⟩—O—$COSCH_3$ | 44.0 |
| 4,4'-methylenebisphenol di(S-dodecylthiocarbonate) | $C_{12}H_{25}SCO$—O—⟨C_6H_4⟩—$CH_2$—⟨C_6H_4⟩—O—$COSC_{12}H_{25}$ | 77.0 |
| 4,4'-methylenebisphenol di(S-p-chlorophenylthiocarbonate) | Cl—⟨C_6H_4⟩—S—CO—O—⟨C_6H_4⟩—$CH_2$—⟨C_6H_4⟩—O—CO—S—⟨C_6H_4⟩—Cl | 215 |
| 4,4'-isopropylidenebisphenol di(S-methylthiocarbonate) | $CH_3SCO$—O—⟨C_6H_4⟩—C($CH_3$)$_2$—⟨C_6H_4⟩—O—$COSCH_3$ | 57.0 |
| 4,4'-cyclopentylidenebisphenol di(S-methylthiocarbonate) | $CH_3SCO$—O—⟨C_6H_4⟩—C(cyclopentyl)—⟨C_6H_4⟩—O—$COSCH_3$ | 57.0 |
| 4,4'-cyclohexylidenebisphenol di(S-methylthiocarbonate) | $CH_3SCO$—O—⟨C_6H_4⟩—C(cyclohexyl)—⟨C_6H_4⟩—O—$COSCH_3$ | 118.0 |

Table II
KNOWN COMPOUNDS FOR COMPARISON

| Compound | Structure | Oxygen Induction Times (Hours) |
|---|---|---|
| p,p'-Biphenol | HO—⟨C_6H_4⟩—⟨C_6H_4⟩—OH | 16.5 |
| 4,4'-methylenebisphenol | HO—⟨C_6H_4⟩—$CH_2$—⟨C_6H_4⟩—OH | 7.0 |
| 4,4'-isopropylidenebisphenol | HO—⟨C_6H_4⟩—C($CH_3$)$_2$—⟨C_6H_4⟩—OH | [1] 9.0–14.5 |
| 4,4'-isopropylidenebisphenol diacetate | $CH_3CO$—O—⟨C_6H_4⟩—C($CH_3$)$_2$—⟨C_6H_4⟩—O—$COCH_3$ | 0.0 |
| 4,4'-cyclohexylidenebisphenol | HO—⟨C_6H_4⟩—C(cyclohexyl, with HO—phenyl substituent)—⟨C_6H_4⟩ | 26.0 |

[1] Range depends upon origin of sample, i.e. The Dow Chemical Company 9.0, Monsanto Chemical Company 13.5, Shell Development Company 14.5.

We claim:
1. A compound having the formula

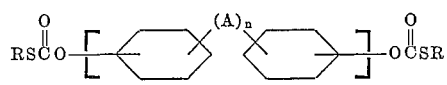

wherein A represents a member selected from the group consisting of sulfur, oxygen, alkylene containing from 1 to 6 carbon atoms, cycloalkylene having from 4 to 6 carbon atoms in the ring; $n$ represents an integer from 0 to 1 inclusive; and, R represents a member selected from the group consisting of an alkyl radical containing from 1 to 18 carbon atoms, phenyl, naphthyl, phenylalkyl, alkylphenyl and halophenyl radicals.

2. 4,4' - isopropylidenebisphenol di(S-p-chlorophenylthiocarbonate).

3. 4,4′-isopropylidenebisphenol di(S-isopropylthiocarbonate).
4. 4,4′-isopropylidenebisphenol di(S-t-butylthiocarbonate).
5. 4,4′-methylenebisphenol di(S-dodecylthiocarbonate).
6. 4,4′-cyclohexylidenebisphenol di(S-methylthiocarbonate).
7. 4,4′-isopropylidenebisphenol di(S-methylthiocarbonate).
8. 4,4′-biphenol di(S-methylthiocarbonate).
9. 4,4′-methylenebisphenol di(S-methylthiocarbonate).
10. 4,4′-cyclopentylidenebisphenol di(S-methylthiocarbonate).
11. 4,4′-isopropylidenebisphenol (S-alkyl thiocarbonate).

References Cited in the file of this patent
UNITED STATES PATENTS

| | | |
|---|---|---|
| 2,396,487 | Blake | Mar. 12, 1946 |
| 2,587,437 | Bralley et al. | Feb. 26, 1952 |

OTHER REFERENCES

Rivier: Chem. Abs., vol. 1, 300 4–5 (1907).
Wagner and Zook: "Synthetic Organic Chemistry," pp. 483, 827 (1953).
Noller: "Chemistry of Organic Compounds," 2nd ed., pp. 272 (1957).
Gilman: "Organic Chemistry," 2nd ed., vol. 1, page 938.